United States Patent
Wang et al.

(10) Patent No.: US 10,805,620 B2
(45) Date of Patent: Oct. 13, 2020

(54) METHOD AND APPARATUS FOR DERIVING COMPOSITE TRACKS

(71) Applicant: MEDIATEK INC., Hsinchu (TW)

(72) Inventors: Xin Wang, San Jose, CA (US); Wang Lin Lai, San Jose, CA (US); Lulin Chen, San Jose, CA (US); Shan Liu, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 275 days.

(21) Appl. No.: 15/865,916

(22) Filed: Jan. 9, 2018

(65) Prior Publication Data

US 2018/0199044 A1    Jul. 12, 2018

Related U.S. Application Data

(60) Provisional application No. 62/444,882, filed on Jan. 11, 2017.

(51) Int. Cl.
| | |
|---|---|
| *H04N 19/169* | (2014.01) |
| *H04N 19/167* | (2014.01) |
| *H04N 19/136* | (2014.01) |
| *H04N 19/70* | (2014.01) |
| *H04N 21/81* | (2011.01) |

(Continued)

(52) U.S. Cl.
CPC ....... *H04N 19/1883* (2014.11); *H04N 19/136* (2014.11); *H04N 19/167* (2014.11); *H04N 19/70* (2014.11); *H04N 21/234* (2013.01); *H04N 21/816* (2013.01); *H04N 21/85406* (2013.01); *H04N 19/103* (2014.11)

(58) Field of Classification Search
None
See application file for complete search history.

(56) References Cited

U.S. PATENT DOCUMENTS

| | | |
|---|---|---|
| 7,107,550 B2 | 9/2006 | Newman |
| 8,477,591 B2 | 7/2013 | Horio et al. |

(Continued)

FOREIGN PATENT DOCUMENTS

CN    103295569 A    9/2013

OTHER PUBLICATIONS

Byeongdoo Choi, et al. "WD on ISO/IEC 23000-20 Omnidirectional Media Application Format", ISO/IEC JTC1/SC29/WG11 N16439, Systems, 2016, pp. 1-65.

(Continued)

*Primary Examiner* — James M Anderson, II
(74) *Attorney, Agent, or Firm* — Oblon, McClelland, Maier & Neustadt, L.L.P.

(57) ABSTRACT

Aspects of the disclosure provide a method and an apparatus for deriving composite tracks. The disclosed apparatus includes a processing circuitry. The processing circuitry is configured to generate a file that includes elementary track boxes respectively for elementary tracks. The elementary track box indexes a sequence of media samples in a time order that forms an elementary track. The processing circuitry is configured to construct a composite track box for a composite track. The composite track box identifies one or more elementary tracks, and a composite operation to form the composite track based on the one or more elementary tracks. The processing circuitry is further configured to generate a media presentation based on the composite track.

19 Claims, 4 Drawing Sheets

(51) Int. Cl.
   *H04N 21/854* (2011.01)
   *H04N 21/234* (2011.01)
   *H04N 19/103* (2014.01)

(56) References Cited

U.S. PATENT DOCUMENTS

| | | | |
|---|---|---|---|
| 9,640,172 | B2 | 5/2017 | Kayama |
| 2004/0113954 | A1 | 6/2004 | Newman |
| 2011/0044315 | A1 | 2/2011 | Horio et al. |
| 2013/0231928 | A1 | 9/2013 | Kayama |
| 2014/0343914 | A1 | 11/2014 | Sundaram et al. |
| 2016/0165321 | A1* | 6/2016 | Denoual ............ H04N 21/4382 725/116 |
| 2016/0182927 | A1* | 6/2016 | Denoual ........ H04N 21/234345 725/109 |

OTHER PUBLICATIONS

Shinya Shimizu, et al. "Use Cases and Requirements on Free-viewpoint Television (FTV) v.2", ISO/IEC JTC1/SC29/WG11 MPEG2015/N15/32, Requirements, 2015, pp. 1-15.

Xin Wang, et al. "Canonicalization of VR Content Flow Process", ISO/IEC JTC1/SC29/WG11 MPEG2016/M39318, MediaTek, 2016, pp. 1-7.

"Information technology—Coding of audio-visual objects—Part 12: ISO Base Media File Format", ISO/IEC 14496-12:2015(E), Ed. 5, 2015, pp. 1-293.

"Draft text of ISO/IEC 23009-1 3rd edition", ISO/IEC JTC1/SC29/WG11 N16225, Systems, 2016, pp. 1-682.

Miska M. Hannuksela, "Technologies under Consideration for ISOBMFF", ISO/IEC JTC1/SC29/WG11 MPEG2016/N16420, Output document, 2016, pp. 1-9.

Emmanuel Thomas, "Text of ISO/IEC 23001-10:2015/FDAM 1 Carriage of spatial information", ISO/IEC JTC1/SC29/WG11 N16191, Editor, 2016, pp. 1-8.

Combined Office Action and Search Report dated Feb. 27, 2019 in Taiwanese Patent Application No. 107100915, 10 pages (with English translation and English translation of categories of cited documents).

International Search Report and Written Opinion dated Apr. 12, 2018 in PCT/CN2018/072190.

* cited by examiner

METHOD AND APPARATUS FOR DERIVING COMPOSITE TRACKS

INCORPORATION BY REFERENCE

This present disclosure claims the benefit of U.S. Provisional Application No. 62/444,882, "Methods and Apparatus of Deriving Composite Tracks in ISOBMFF" filed on Jan. 11, 2017, which is incorporated herein by reference in its entirety.

TECHNICAL FIELD

The present disclosure describes embodiments generally related to video coding method and apparatus, and more particularly related to multi-track virtual reality, including omni-directional, video coding technology.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Virtual reality (VR) video, such as omnidirectional video/360 video, can be rendered to provide special user experience. For example, in a virtual reality application, computer technologies create realistic images, sounds and other sensations that replicate a real environment or create an imaginary setting, thus a user can have a simulated VR video experience of a physical presence in an environment.

SUMMARY

Aspects of the disclosure provide an apparatus that includes processing circuitry. The processing circuitry is configured to generate a file that includes elementary track boxes respectively for elementary tracks. The elementary track box indexes a sequence of media samples in a time order that forms an elementary track. The processing circuitry is configured to construct a composite track box for a composite track. The composite track box identifies one or more elementary tracks, and a composite operation to form the composite track based on the one or more elementary tracks. The processing circuitry is further configured to generate a media presentation based on the composite track.

In an example, the processing circuitry is configured to construct the composite track box to identify the composite operation that selects one of the elementary tracks at a track level to form the composite track. In another example, the processing circuitry is configured to construct the composite track box to identify the composite operation that selects one of the elementary tracks at a sample level to form the composite track. In another example, the processing circuitry is configured to construct the composite track box to identify the composite operation that selects one or more of the elementary tracks to form the composite track.

In an embodiment, the processing circuitry is configured to construct composite track boxes for composite tracks having a hierarchy.

According to an aspect of the disclosure, the processing circuitry is configured to include global information for the identified elementary tracks in the composite track box.

In an embodiment, the processing circuitry is configured to receive a value for a composition variable associated with the composition operation and construct a media stream based on the elementary tracks according to the composite operation and the value.

Aspects of the disclosure provide a method for processing media data. The method includes generating a file that includes elementary track boxes respectively for elementary tracks, indexing, in an elementary track box, a sequence of media samples in a time order that forms an elementary track, constructing a composite track box for a composite track, identifying, in the composite track box, one or more elementary tracks, and a composite operation to form the composite track based on the one or more elementary tracks, and generating a media presentation based on the composite track.

Aspects of the disclosure provide a non-transitory computer readable medium storing program instructions for causing a processor to execute operations for processing media data. The operations include generating a file that includes elementary track boxes respectively for elementary tracks, indexing, in an elementary track box, a sequence of media samples in a time order that forms an elementary track, constructing a composite track box for a composite track, identifying, in the composite track box, one or more elementary tracks, and a composite operation to form the composite track based on the one or more elementary tracks, and generating a media presentation based on the composite track.

Aspects of the disclosure provide another apparatus that includes processing circuitry. The processing circuitry is configured to receive a file that includes elementary track boxes respectively for elementary tracks and at least one composite track box for a composite track. Each elementary track box indexes a sequence of media samples in a time order that forms an elementary track. The composite track box identifies one or more elementary tracks, and a composite operation to derive the composite track based on the one or more elementary tracks and a composition variable. The processing circuitry is configured to receive a value for the composition variable associated with the composition operation and construct a media stream based on the elementary tracks according to the composite operation and the value.

Aspects of the disclosure also provide a method for processing media data. The method includes receiving a file that includes elementary track boxes respectively for elementary tracks and at least one composite track box for a composite track. Each elementary track box indexes a sequence of media samples in a time order that forms an elementary track. The composite track box identifies one or more elementary tracks, and a composite operation to derive the composite track based on the one or more elementary tracks and a composition variable. The method further includes receiving a value for the composition variable associated with the composition operation and constructing a media stream based on the elementary tracks according to the composite operation and the value.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Virtual reality (VR) content, especially omnidirectional video/360 video content, can be represented as a plurality of media streams over time. The media streams are referred to as tracks, when they are represented or captured in a file format such as ISO base media file format (ISOBMFF). In some embodiments, a track includes a sequence of image samples in time order, and the sequence of image samples is associated with a sub-region (also referred to as a tile, a partition, sub-picture) in the VR environment. Thus, multiple tracks are respectively associated with sub-regions in the VR environment. In various VR video applications, content is requested and delivered as a group of tracks. In a related art, tracks are labeled individually to identify membership to groups. In the related art, membership determination can be inefficient due to a requirement of looking into individual tracks to find labels that identify the membership to groups. Aspects of the disclosure provide techniques to construct composite tracks, each of which is a composite of multiple tracks. Thus, global information, such as common attribute and metadata, group membership, and the like for a group of tracks can be included in or associated with a composite track. The composite tracks are then used to facilitate, media presentation, content request, and the like.

Figure 1:
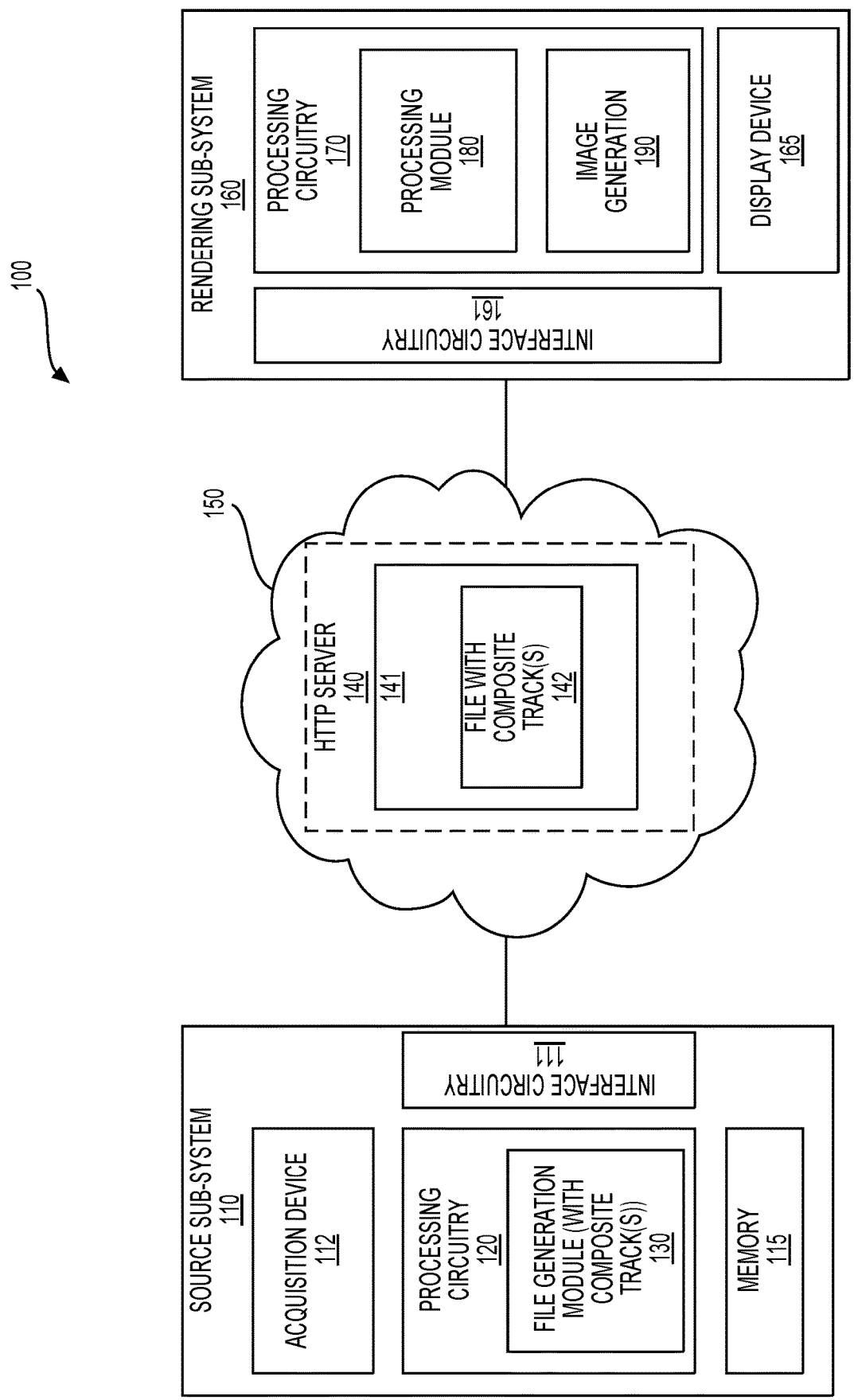
FIG. 1 shows a block diagram of a media system 100 according to an embodiment of the disclosure.

FIG. 1 shows a block diagram of a media system 100 according to an embodiment of the disclosure. The media system 100 includes a source sub-system 110, a delivery sub-system 150 and a rendering sub-system 160 coupled together. The source sub-system 110 is configured to acquire media data for VR video and suitably encapsulate the media data. The delivery sub-system 150 is configured to deliver the encapsulated media data from the source sub-system 110 to the rendering sub-system 160. The rendering sub-system 160 is configured to render VR video according to the media data.

According to an aspect of the disclosure, the source sub-system 110 structures media data into one or more elementary tracks, and each elementary track is formed based on a sequence of samples in time order. In an embodiment, the source sub-system 110 structures image/video data into elementary tracks according to specific attributes, such as spatial partitions, image qualities, encryption modes and the like. Further, the source sub-system 110 constructs composite tracks based on the elementary tracks. In some embodiments, a composite track is a virtual track with variable parameters, in addition to potentially static parameters determined at the time the composite track is specified and signaled. The composite track can be used to virtually represent a media stream with variable parameters during media processing. When the variable parameters are determined, for example, at a time of media delivery or consumption, a real media stream can be generated based on the composite track and the determined variable parameters.

In an example, a composite track is constructed as a composite of elementary tracks corresponding to different spatial partitions. Thus, the composite track is a virtual representation of a media stream formed by the elementary tracks with a spatial region being variable. When the spatial region is determined for example at a time of delivery or consumption, a real media stream can be generated based on the composite track and the determined spatial region.

In another example, a composite track is constructed as a composite of elementary tracks corresponding to different image qualities. Thus, the composite track is a virtual representation of a media stream formed by the elementary tracks with image quality being a variable. In an embodiment, VR content is delivered by a network, and VR content of different image qualities are transmitted under different network traffic status. At a time of delivery, the image quality is determined based on network traffic status at the time, and a real media stream can be generated based on the composite track and the image quality requirement.

In another example, a composite track is constructed as a composite of elementary tracks corresponding to different encryption modes. Thus, the composite track is a virtual representation of a media stream formed by the elementary tracks with encryption mode being a variable. When an encryption mode is determined for example based on a security requirement, a real media stream can be generated based on the composite track and the security requirement.

The source sub-system 110 can construct the composite tracks with hierarchy, based on multiple levels of variable parameters. For example, the source sub-system 110 can construct first level composite tracks based on elementary tracks with image quality being a variable. Then, the source sub-system 110 can construct second level composite tracks based on the first level composite tracks with encryption mode being variable. Further, the source sub-system 110 can construct third level composite tracks based on the second level composite tracks with a spatial region being variable.

According to an aspect of the disclosure, the source sub-system 110 hierarchically groups the elementary tracks into one or more composite tracks. Further, the source sub-system 110 includes global information, group information and membership information hierarchically in the composite tracks. Thus, the global information, group information and membership information can be extracted from the composite tracks. With the hierarchy structure of the composite tracks and the elementary tracks, when variable parameters are determined, a real media stream can be constructed following the hierarchy structure.

The source sub-system 110 can be implemented using any suitable technology. In an example, components of the source sub-system 110 are assembled in a device package. In another example, the source sub-system 110 is a distributed system, components of the source sub-system 110 can be arranged at different locations, and are suitable coupled together for example by wire connections (e.g., cables) and/or wireless connections (e.g., wireless channels).

In the FIG. 1 example, the source sub-system 110 includes an acquisition device 112, a processing circuitry 120, a memory 115, and an interface circuitry 111 coupled together.

The acquisition device 112 is configured to acquire various media data, such as images, sound, and the like of omnidirectional video/360 video. The acquisition device 112 can have any suitable settings. In an example, the acquisition device 112 includes a camera rig (not shown) with multiple cameras, such as an imaging system with two fisheye cameras, a tetrahedral imaging system with four cameras, a cubic imaging system with six cameras, an octahedral imaging system with eight cameras, an icosahedral imaging system with twenty cameras, and the like, configured to take images of various directions in a surrounding space.

In an embodiment, the images taken by the cameras are overlapping, and can be stitched to provide a larger coverage of the surrounding space than a single camera. In an example, the images taken by the cameras can provide 360° sphere coverage of the whole surrounding space. It is noted that the images taken by the cameras can provide less than 360° sphere coverage of the surrounding space.

The media data acquired by the acquisition device 112 can be suitably stored or buffered, for example in the memory 115. The processing circuitry 120 can access the memory 115, process the media data, and encapsulate the media data in suitable format. The encapsulated media data is then suitably stored or buffered, for example in the memory 115.

In an embodiment, the processing circuitry 120 includes an audio processing path configured to process audio data, and includes an image/video processing path configured to process image/video data. The processing circuitry 120 then encapsulates the audio, image and video data with metadata according to a suitable format.

In the present disclosure, image and video data is used as examples to illustrate techniques for composite track construction. The techniques can be suitable adjusted for other media data, such as audio data, and the like.

In an example, on the image/video processing path, the processing circuitry 120 can stitch images taken from different cameras together to form a stitched image, such as an omnidirectional image, and the like. Then, the processing circuitry 120 can project the omnidirectional image according to suitable two-dimension (2D) plane to convert the omnidirectional image to 2D images that can be encoded using 2D encoding techniques. Then the processing circuitry 120 can suitably encode the image and/or a stream of images.

It is noted that the processing circuitry 120 can project the omnidirectional image according to any suitable projection technique. In an example, the processing circuitry 120 can project the omnidirectional image using equirectangular projection (ERP). The ERP projection projects a sphere surface, such as omnidirectional image, to a rectangular plane, such as a 2D image, in a similar manner as projecting earth surface to a map. In an example, the sphere surface (e.g., earth surface) uses spherical coordinate system of yaw (e.g., longitude) and pitch (e.g., latitude), and the rectangular plane uses XY coordinate system. During the projection, the yaw circles are transformed to the vertical lines and the pitch circles are transformed to the horizontal lines, the yaw circles and the pitch circles are orthogonal in the spherical coordinate system, and the vertical lines and the horizontal lines are orthogonal in the XY coordinate system.

In another example, the processing circuitry 120 can project the omnidirectional image to faces of platonic solid, such as tetrahedron, cube, octahedron, icosahedron, and the like. The projected faces can be respectively rearranged, such as rotated, relocated to form a 2D image. The 2D images are then encoded.

It is noted that, in an embodiment, the processing circuitry 120 can encode images taken from the different cameras, and does not perform the stitch operation and/or the projection operation on the images.

According to an aspect of the disclosure, the processing circuitry 120 is configured to encapsulate the media data of the omnidirectional video/360 video into multiple elementary tracks, and construct composite tracks as logical and/or spatial composition of the multiple elementary tracks.

In an embodiment, the sphere surface (or its projected version) can be spatially divided into multiple partitions (also known as sub-pictures, regions, tiles). The processing circuitry 120 can form an elementary track based on a timed sequence of image samples of a partition. Thus, video content of the sphere surface is structured into multiple elementary tracks respectively corresponding to the multiple partitions. In an example, when the sphere surface is partitioned into four partitions, the video content of the sphere surface is structured into four elementary tracks. In an example, the processing circuitry 120 forms a composite track that is a spatial composite of all four elementary tracks. The composite track corresponds to the video content of the sphere surface. The four elementary tracks are members of the composite track. Thus, global information, such as common attributes and metadata, and membership information can be defined in the composite track instead of the individual elementary tracks. In the present disclosure, the spatial composite of all elementary tracks (or lower level composite tracks) is referred to as 'composite of all' operation or 'cmpa'.

In an example, the 'composite of all' operation ('cmpa') is used in a guided viewport example. In the guided viewport example, the viewport varies over time to provide a guided visual experience. The viewport corresponds to different partitions (e.g., via membership of the partitions to the viewport) of the sphere surface at different time. In an example, a composite track is constructed based on the 'composite of all' operation ('cmpa') of elementary tracks corresponding to partitions. The membership of the elementary tracks to the viewport can be identified in the composite track instead of the individual elementary tracks. Thus, at a time for content delivery corresponding to the viewport, elementary tracks for delivery can be determined based on the membership information in the composite track.

In another embodiment, the video content of the sphere surface is encoded into multiple elementary tracks with different image qualities. In an example, the video content of the sphere surface is encoded with a relatively high image quality to construct a first elementary track, and is encoded with a relatively a low image quality to construct a second elementary track. In an example, the processing circuitry 120 forms a composite track that is a logical composite of the first elementary track and the second elementary track at sample or sample group level. The composite track is defined as a sample or sample group level logical composition of one of the first elementary track and the second elementary track with image quality being a variable, and can switch between the first elementary track and the second elementary track at the sample level or sample group level. In the present disclosure, the sample or sample group level logical composition of one of multiple elementary tracks (or lower level composite tracks) is referred to as 'composite of only one' operation or 'cmp1'.

In an example, the 'composite of only one' operation is used in a dynamic adaptive streaming over HTTP (DASH) example. In the DASH example, the composite track is used to represent the video content of the sphere surface with image quality being a variable. During content delivery, the image quality can be determined based on available network bandwidth, thus one of the first elementary track (e.g., with high quality images), and the second elementary track (e.g., with low quality images), is dynamically selected and provided to the rendering sub-system 160. For example, initially, when available network bandwidth information is not available, the second elementary track is selected to ensure initial delivery. When the available network bandwidth information is available, and the available network bandwidth is enough for delivering the high quality images, the first elementary track is selected to improve image quality. However, when the network becomes congested, the available network bandwidth is not enough for delivering the high quality images, the second elementary track is then selected for delivery.

In another embodiment, the video content of the sphere surface is encrypted according to different encryption modes. In an example, according to a first encryption mode such as an advanced encryption standard (AES) cipher block chaining (CBC) mode, the video content of the sphere surface is encrypted before video coding to construct a first elementary track; and according to a second encryption mode such as the AES counter (CTR) mode, the video content of the sphere surface is encrypted after video coding to construct a second elementary track. In an example, the processing circuitry 120 forms a composite track that is a track level logic composite of one of the first elementary track and the second elementary track with encryption mode being variable. The composite track is defined as a track level logic composition of the first elementary track and the second elementary track, and can switch between the first elementary track and the second elementary track at the track level. In the present disclosure, the track level logic composition of one of multiple elementary tracks (or lower level composite tracks) is referred to as 'selection of only one' operation or 'sel1'.

In an example, the 'selection of only one' operation is used to suite different security requirement. Based on an encryption mode requirement for a target device, one of the first elementary track and the second elementary track is selected and provided to the rendering sub-system 160. For example, when the AES CBC mode is required for video content delivery, the first elementary track is selected and provided to the rendering sub-system 160; and when the AES CTR mode is needed for video content delivery, the second elementary track is selected and provided to the rendering sub-system 160.

It is noted that the video content of the sphere surface can be structured into multiple elementary tracks based on multiple variables, such as spatial partitions, image qualities encryption modes and the like. Then, a composite track can be derived from the multiple elementary tracks via multiple composition operations in a hierarchical manner, which will be further discussed with reference to FIG. 2 and FIG. 3.

It is noted that sphere surface can be divided into multiple partitions using various techniques. In an example, the ERP projection projects a sphere surface to a rectangular plane, and the rectangular plane is divided into multiple partitions (also known as "sub-pictures").

In another example, the platonic solid projection projects a sphere surface into faces (that are partitions) of a platonic solid. In the example, the sphere surface is partitioned according to the faces of the platonic solid.

In another example, multiple cameras are configured to take images in different directions of a scene. In the example, the scene is partitioned according to the field of views of the cameras.

According to an aspect of the disclosure, the processing circuitry 120 includes a file generation module 130 configured to encapsulate elementary tracks, composite tracks in files. In an embodiment, the processing circuitry 120 is configured to use an extensible format standard, such as ISO base media file format (ISOBMFF) and the like for time-based media, such as video and/or audio. In an example, the ISO base media file format defines a general structure for time-based multimedia files, and is flexible and extensible that facilitates interchange, management, editing and presentation of media. The ISO base media file format is independent of particular network protocol, and can support various network protocols in general. Thus, in an example, presentations based on files in the ISO base media file format can be rendered locally, via network or via other stream delivery mechanism.

Generally, a media presentation can be contained in one or more files. One specific file of the one or more files includes metadata for the media presentation, and is formatted according to a file format, such as the ISO base media file format. The specific file can also include media data. When the media presentation is contained in multiple files, the other files can include media data. In an embodiment, the metadata is used to describe the media data by reference to the media data. Thus, in an example, the media data is stored in a state agnostic to any protocol. The same media data can be used for local presentation, multiple protocols, and the like. The media data can be stored with or without order.

The ISO base media file format includes a specific collection of boxes. The boxes are the logical containers. Boxes include descriptors that hold parameters derived from the media content and media content structures. The media is encapsulated in a hierarchy of boxes. A box is an object-oriented building block defined by a unique type identifier.

In an example, the presentation of media content is referred to as a movie and is divided into tracks that are parallel in term of time. Each track represents a timed sequence of samples of media content. Media content are stored and accessed by access units, such as frames, and the like. The access unit is defined as the smallest individually accessible portion of data within an elementary stream, and unique timing information can be attributed to each access unit. In an embodiment, access units can be stored physically in any sequence and/or any grouping, intact or subdivided into packets. The ISO base media file format uses the boxes to map the access units to a stream of samples using references to byte positions where the access units are stored. In an example, the sample information allows access units to be decoded and presented synchronously on a timeline, regardless of storage.

According to an aspect of the disclosure, the processing circuitry 120 is configured to include composition information of composite tracks as their metadata. In an embodiment, the processing circuitry 120 is configured to use a track box to include metadata for a track (e.g., elementary track, composite track). For example, the processing circuitry 120 uses elementary track boxes to respectively include metadata for elementary tracks, and uses composite track boxes to respectively include metadata for composite tracks. The processing circuitry 120 can include description of attributes, such as the spatial partition, logical and/or spatial compositions, in the metadata for the track. For example, the processing circuitry 120 can generate a composite track box for a composite track. The composite track box includes references (or identifiers) to input tracks, such as elementary tracks, or lower level composite tracks, and includes a transform property to define a composite operation to construct the composite track based on the input tracks. The composite operation can be any suitable composite operations, such as 'composite of all' operation ('cmpa'), 'composite of only one' operation ('cmp1'), 'composite of any' operation ('cmpn'), 'selection of only one' operation ('sel1'), 'selection of any' operation ('seln'), scaling operation ('scal'), resize operation ('resz'), and the like. The definition, syntax and semantics of exemplary composite operations are shown in Appendix A.

It is noted that other suitable composite operations can be defined in similarly manner.

In an embodiment, the processing circuitry 120 is implemented using one or more processors, and the one or more processors are configured to execute software instructions to perform media data processing. In another embodiment, the processing circuitry 120 is implemented using integrated circuits.

In the FIG. 1 example, the encapsulated media data is provided to the delivery sub-system 150 via the interface circuitry 111. The delivery sub-system 150 is configured to suitably provide the media data to client devices, such as the rendering sub-system 160.

In an embodiment, the delivery sub-system 150 includes various network elements, such as routers, network switches, base stations, access points and the like to form a delivery path between the source sub-system 110 and the rendering sub-system 160. In an example, the source sub-system 110 sends a media presentation including a composite track to the rendering sub-system 160 via the delivery sub-system 150. The composite track is constructed from elementary tracks corresponding to different partitions of a sphere surface (with sub-picture region being variable). The rendering sub-system 160 signals viewport information to the source sub-system 110 via the delivery sub-system 150. The viewport information is indicative of sub-pictures that are requested by the rendering sub-system 160. Based on the viewport information and other suitable environmental information at the time of content delivery and/or consumption, such as available bandwidth, security requirement, encryption mode, time duration in the media stream, and the like, the processing circuitry 120 performs just-in-time processing. For example, the processing circuitry 120 selects suitable elementary tracks based on the viewport information, selects suitable image samples based on the time duration, and encodes and/or encrypts the selected image samples based on the available bandwidth and encryption mode requirement to generate packets. The delivery sub-system 150 delivers the packets to the rendering sub-system 160. The rendering sub-system 160 then decodes and/or decrypts the packets to reconstruct the image samples for display.

In another embodiment, the delivery system 150 includes a hypertext transfer protocol (HTTP) server 140 with a memory 141. The memory 141 stores a file 142 that include composition information of composite tracks as their metadata. The HTTP server 140 is configured to provide the composite tracks to a rendering system, such as the rendering system 160, according to an HTTP protocol. The components of the delivery system 150 are suitably coupled together via wired and/or wireless connections. The delivery system 150 is suitably coupled with the source system 110 and the rendering system 160 via wired and/or wireless connections.

The rendering sub-system 160 can be implemented using any suitable technology. In an example, components of the rendering sub-system 160 are assembled in a device package. In another example, the rendering sub-system 160 is a distributed system, components of the source sub-system 110 can be located at different locations, and are suitable coupled together by wire connections and/or wireless connections.

In the FIG. 1 example, the rendering sub-system 160 includes an interface circuitry 161, a processing circuitry 170 and a display device 165 coupled together. The interface circuitry 161 is configured to suitably receive media information, such as files of media presentation, media stream and the like via any suitable communication protocol.

The processing circuitry 170 is configured to process the media information and generate images for the display device 165 to present to one or more users. The display device 165 can be any suitable display, such as a television, a smart phone, a wearable display, a head-mounted device, and the like.

In an example, the processing circuitry 170 includes a processing module 180 and an image generation module 190. The processing module 180 is configured to perform packet processing, control and communication operations. The image generation module 190 is configured to generate images of the region of interests. The processing module 180 and the image generation module 190 can be implemented as processors executing software instructions or can be implemented as integrated circuits.

According to an aspect of the disclosure, the rendering sub-system 160 can operate similarly as the source sub-system 110 to construct the real media stream. In an embodiment, the source sub-system 110 sends a media file (such as a file 200 in FIG. 2) to the rendering sub-system 160 via the delivery sub-system 150. The media file includes metadata for media presentation and includes media data. For example, the media file includes elementary track boxes respectively for elementary tracks and composite track boxes for composite tracks. Each elementary track box indexes a sequence of media samples in a time order that forms an elementary track. The composite tracks are constructed based on the elementary tracks in a hierarchical manner. A composite track box identifies one or more elementary tracks (or lower level composite tracks), and a composite operation to derive the composite track based on the one or more elementary tracks (or lower level composite tracks) and a composition variable.

Further, based on the media file, the processing circuitry 170 can form a real media stream for play back. For example, the processing circuitry 170 receives values for composition variables associated with the composition operations. Based on the values of the composition variables and the hierarchy of the composite tracks, the processing circuitry 170 can trace the elementary tracks, extract samples from the media file, and construct a media stream for playback.

Figure 2:
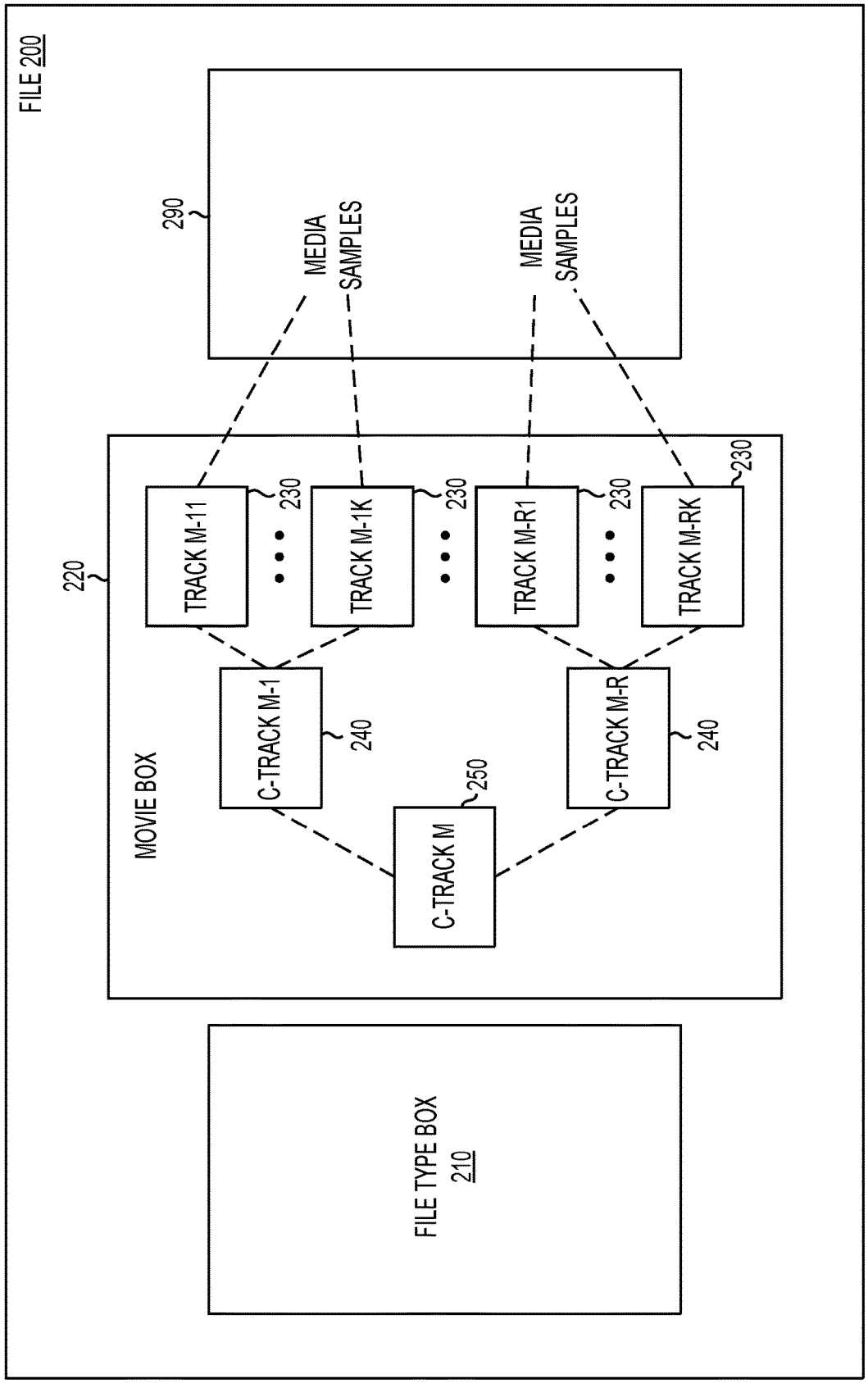
FIG. 2 shows a diagram of a media file 200 according to an embodiment of the disclosure.

FIG. 2 shows a diagram of a file 200 according to an embodiment of the disclosure. The file 200 conforms to the ISOBMFF. In an example, the processing circuitry 120 in FIG. 1 is configured to generate the file 200 that conforms to the ISOBMFF.

The file 200 includes various boxes, such as a file type box 210, a media data box 290, a movie box 220, and the like. The file type box 210 includes file type and compatibility information. The media data box 290 includes media samples. The movie box 220 includes metadata for media streams that can be formed by the media samples. The movie box 220 includes various track boxes, such as elementary track boxes 230 for elementary tracks, composite track boxes 240 and 250 for composite tracks. The elementary track box can include information for a media stream. In an example, an elementary track box 230 includes a track header box that specifies overall information of an elementary track. In addition, the elementary track box can include a media box that contains a media information box. The media information box may include a sample table box that contains data indexes to a subset of media samples in the media data box 290. Information in the sample table box may be used to locate the subset of media samples, and to form a sequence using the subset of media samples.

In an example, a sphere surface is divided into R partitions, where R is a positive integer. Thus, the media data box 290 includes R subsets corresponding to the R partitions. Further, the media samples can be encrypted according to K encryption modes, where K is a positive integer. In the FIG. 2 example, the elementary tracks M-11 to M-1K correspond to the first subset of media samples (corresponding to the first partition) but with different encryption modes. For example, the elementary track M-11 is formed based on a first subset of the media samples with a first encryption mode, and the elementary track M-1K is formed based on the first subset of the media samples with a Kth encryption mode. Similarly, the elementary track M-R1 is formed based on a Rth subset of the media samples (corresponding to the Rth partition) with the first encryption mode, and the elementary track M-RK is formed based on the Rth subset of the media samples 290 with the Kth encryption mode.

Further, the composite track boxes 240 and 250 include information to construct composite tracks based on elementary tracks or lower level composite tracks. Each of the composite track boxes 240 and 250 can include identifiers that identify the elementary tracks or the lower level composite tracks as inputs, and can include a transform property to specify a composition operation that constructs the composite track based on the inputs, such as elementary tracks or lower level composite tracks. In the FIG. 2 example, the composite track boxes 240 define composite tracks M-1 to M-R. For example, the composite track M-1 is constructed using the elementary tracks M-11 to M-1K based on a transform property of 'selection of only one' operation; the composite track M-R is constructed using the elementary tracks M-R1 to M-RK based on a transform property of 'selection of only one' operation. For example, the composite track box 240 for the composite track M-1 includes identifiers that identify the elementary tracks M-11 to M-1K, and includes other suitable information, such as respective encryption modes for the elementary tracks M-11 to M-1K. The composite track box 240 for the composite track M-1 also includes a transform property box that specifies the 'selection of only one' operation.

In the FIG. 2 example, the composite track box 250 defines a composite track M. For example, the composite track M is constructed using the composite tracks M-1 to M-R based on a transform property of 'composite of all' operation. For example, the composite track box 250 for the composite track M includes identifiers that identify the composite tracks M-1 to M-R, and includes other suitable information, such as respective spatial partitions for the composite tracks M-1 to M-R. The composite track box 250 includes a transform property box that specifies the 'composite of all' operation.

According to an aspect of the disclosure, the composite track M is used to represent the media data for the sphere surface with variable parameters, such as sub-pictures region, encryption mode and the like. In an example, during delivery or consumption, when the variable parameters are determined, a real media stream can be formed based on the hierarchy structure of the composite tracks and the elementary tracks. In an example, the first partition and the first encryption mode are determined at a time during delivery or consumption. Thus, based on first partition and the transform property in the composite track M, the composite track M-1 is selected. Further, based on the first encryption mode and the transform property in the composite track M-1, the elementary track M-11 is selected. Based on the media information in the elementary track M-11, the first subset of media samples can be extracted. The first subset of media samples is encrypted according to the first encryption mode to form a stream of media data for delivery or consumption.

In another example, both the first partition and the Rth partition are determined to contribute a region of interest and the first encryption mode is determined during delivery. Thus, based on partition information and the transform property in the composite track M, the composite track M-1 and the composite track M-R are selected. Further, based on the first encryption mode and the transform property in the composite tracks M-1 and M-R, the elementary track M-11 and the elementary track M-R1 are selected. Based on the media information in the elementary track M-11 and the elementary track M-R1, the first subset of media samples and the Rth subset of media samples can be extracted. The first subset of media samples and the Rth subset of media samples are encrypted according to the first encryption mode to form the media data for delivery or consumption.

Figure 3:
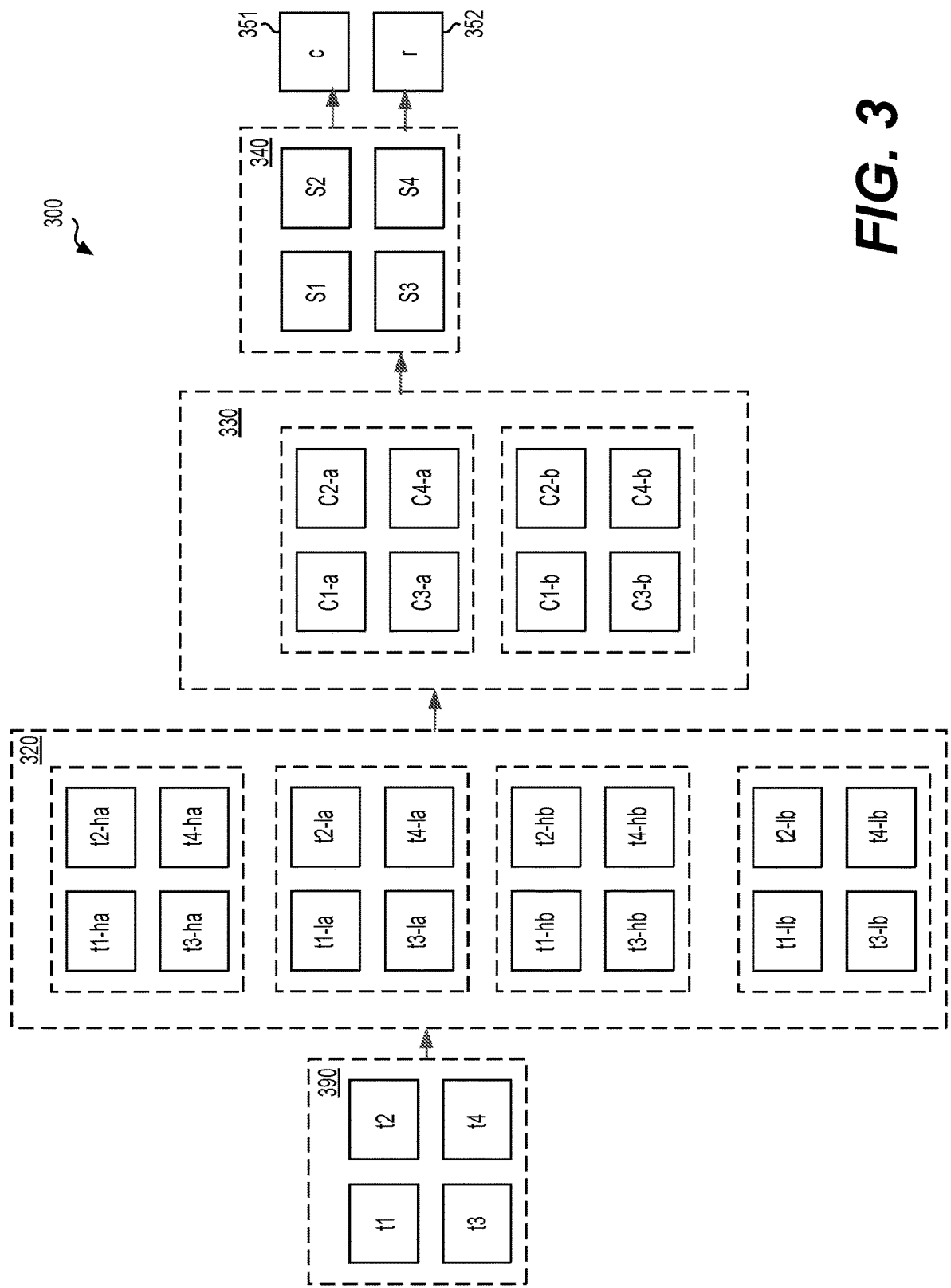
FIG. 3 shows a diagram of deriving composite track according to an embodiment of the disclosure.

FIG. 3 shows a diagram 300 of constructing composite tracks according to an embodiment of the disclosure. In an example, the processing circuitry 120 constructs the composite tracks according to the diagram 300.

In the FIG. 3 example, the sphere surface is divided into four partitions (or tiles). The diagram 300 shows video data 390 for the sphere surface. The video data 390 includes a first subset t1 of image samples for the first partition, a second subset t2 of image samples for the second partition, a third subset t3 of image samples for the third partition, and a fourth subset t4 of image samples for the fourth partition.

In the FIG. 3 example, image samples can be encoded according to two image qualities, a low quality (l) or a high quality (h), and can be encrypted according to a first encryption mode (a) and a second encryption mode (b). Based on the partitions, the image qualities and the encryption modes, the processing circuitry 120 can construct 16 elementary tracks 320.

For example, elementary track t1-ha can be formed based on the first subset of image samples according to the high quality encoding and the first encryption mode; elementary track t2-ha can be formed based on the second subset of image samples according to the high quality encoding and the first encryption mode; elementary track t3-ha can be formed based on the third subset of image samples according to the high quality encoding and the first encryption mode; elementary track t4-ha can be formed based on the fourth subset of image samples according to the high quality encoding and the first encryption mode.

Similarly, elementary track t1-la can be formed based on the first subset of image samples according to the low quality encoding and the first encryption mode; elementary track t2-la can be formed based on the second subset of image samples according to the low quality encoding and the first encryption mode; elementary track t3-la can be formed based on the third subset of image samples according to the low quality encoding and the first encryption mode; elementary track t4-la can be formed based on the fourth subset of image samples according to the low quality encoding and the first encryption mode.

Similarly, elementary track t1-hb can be formed based on the first subset of image samples according to the high quality encoding and the second encryption mode; elementary track t2-hb can be formed based on the second subset of image samples according to the high quality encoding and the second encryption mode; elementary track t3-hb can be formed based on the third subset of image samples according to the high quality encoding and the second encryption mode; elementary track t4-hb can be formed based on the fourth subset of image samples according to the high quality encoding and the second encryption mode.

Similarly, elementary track t1-lb can be formed based on the first subset of image samples according to the low quality encoding and the second encryption mode; elementary track t2-lb can be formed based on the second subset of image samples according to the low quality encoding and the second encryption mode; elementary track t3-lb can be formed based on the third subset of image samples according to the low quality encoding and the second encryption mode; elementary track t4-lb can be formed based on the fourth subset of image samples according to the low quality encoding and the second encryption mode.

Based on the elementary tracks 320, composite tracks 330 are constructed using 'composite of only one' operation ('cmp1'), such as shown by expressions Exp. 1 to Exp. 8:

$$C1\text{-}a = cmp1(t1\text{-}ha, t1\text{-}la) \qquad \text{Exp. 1}$$

$$C2\text{-}a = cmp1(t2\text{-}ha, t2\text{-}la) \qquad \text{Exp. 2}$$

$$C3\text{-}a = cmp1(t3\text{-}ha, t3\text{-}la) \qquad \text{Exp. 3}$$

$$C4\text{-}a = cmp1(t4\text{-}ha, t4\text{-}la) \qquad \text{Exp. 4}$$

$$C1\text{-}b = cmp1(t1\text{-}hb, t1\text{-}lb) \qquad \text{Exp. 5}$$

$$C2\text{-}b = cmp1(t2\text{-}hb, t2\text{-}lb) \qquad \text{Exp. 6}$$

$$C3\text{-}b = cmp1(t3\text{-}hb, t3\text{-}lb) \qquad \text{Exp. 7}$$

$$C4\text{-}b = cmp1(t4\text{-}hb, t4\text{-}lb) \qquad \text{Exp. 8}$$

Further, in the FIG. 3 example, based on the composite tracks 330, composite tracks 340 are constructed using 'selection of only one' operation ('sel1'), such as shown by expressions Exp. 9 to Exp. 12:

$$S1 = sel1(C1\text{-}a, C1\text{-}b) \qquad \text{Exp. 9}$$

$$S2 = sel1(C2\text{-}a, C2\text{-}b) \qquad \text{Exp. 10}$$

$$S3 = sel1(C3\text{-}a, C3\text{-}b) \qquad \text{Exp. 11}$$

$$S4 = sel1(C4\text{-}a, C4\text{-}b) \qquad \text{Exp. 12}$$

Further, in the FIG. 3 example, based on the composite tracks 340, composite tracks 351 and 352 are constructed using 'composite of all' operation ('cmpa'), such as shown by expressions Exp. 13 and Exp. 14:

$$c = cmpa(S1, S2, S3, S4) \qquad \text{Exp. 13}$$

$$r = cmpa(S1, S2) \qquad \text{Exp. 14}$$

In an embodiment, the composite track 351 is used in a media presentation to virtually represent a media stream for the sphere surface, and the composite track 352 is used in a media presentation to virtually represent a media stream for an upper half portion of the sphere surface.

Figure 4:
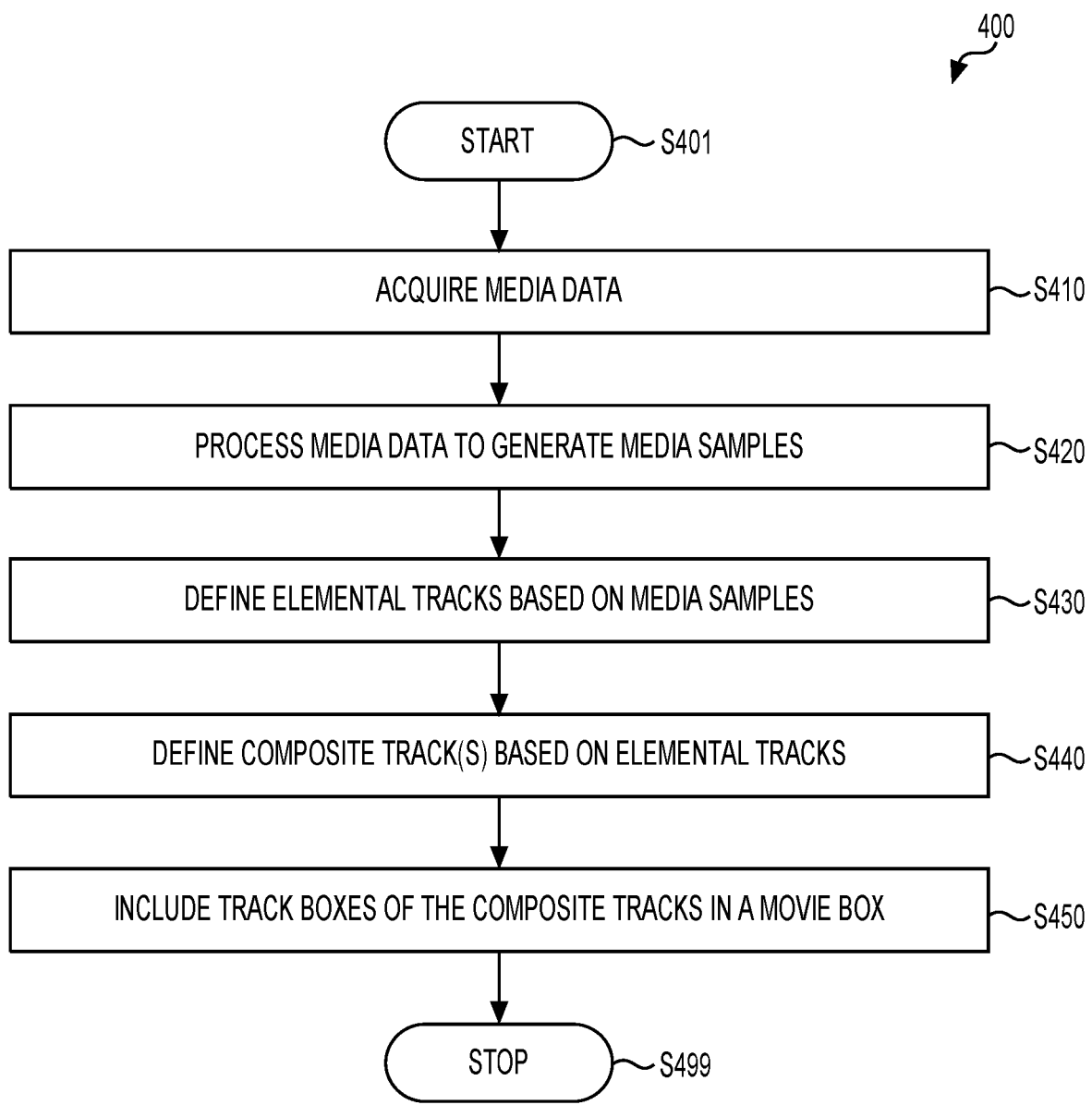
FIG. 4 shows a flow chart outlining a process example 400 according to an embodiment of the disclosure.

FIG. 4 shows a flow chart outlining a process example 400 according to an embodiment of the disclosure. In an example, the process 400 is executed by the source subsystem 110 in the FIG. 1 example. The process starts at S401 and proceeds to S410.

At S410, media data is acquired. In an example, the acquisition device 112 includes a camera rig with multiple cameras to take images of various directions in a surrounding space.

At S420, the media data is processed to generate media samples. In an example, the processing circuitry 120 can stitch images taken from different cameras together to form a stitched image, such as an omnidirectional image, and the like. Then, the processing circuitry 120 can project the omnidirectional image according to suitable two-dimension (2D) plane to convert the omnidirectional image to 2D images.

At S430, elementary tracks are defined. In an example, the 2D plane can be divided into sub-picture regions (partitions), and the processing circuitry 120 generates elementary track boxes to respectively include metadata for elementary tracks. An elementary track box can include information about a stream of image samples for a sub-picture region. The elementary track box includes a track header box that specifies overall information of an elementary track. In addition, the elementary track box can include data indexes that point to a subset of media samples to form the elementary track.

At S440, composite tracks are constructed based on elementary tracks (or lower level composite tracks). In an example, the processing circuitry 120 generates composite track boxes for composite tracks. For example, a composite track box for a composite track includes identifiers of elementary tracks (or lower level composite tracks) as inputs, and includes a transform property to define a composite operation to construct the composite track based on the elementary tracks (or the lower level composite tracks).

At S450, the composite tracks are encapsulated in a file. In an example, the composite tracks are encapsulated in the file 200 that conforms to the ISOBMFF. For example, the processing circuitry 120 includes the composite track boxes for the composite tracks in the movie box 220 with the elementary track boxes for the elementary tracks. Then the process proceeds to S499 and terminates.

APPENDIX A

The present disclosure proposes the following new TransformProperty items:
'cmpa': composite of all
'cmp1': composite of only one (allowing switching at the sample level)
'cmpn': composite of any (allowing switching at the sample level)
'sel1': selection of only one (track level selection, no switching at the sample level)
'seln': selection of any (track level selection, no switching at the sample level)
'scal': scaling
'resz': resize With these new items, a "tile" track can be specified as a derived, composite track of its "variant" tracks using 'cmp1' or 'sel1', the entire VR spherical content track can be specified as a derived, composite track of its "tile" tracks using 'cmpa', and any viewport or ROI track can be specified as a derived, composite track of its "tile" tracks using 'cmpn' or 'seln', followed by further reversed mapping and projection transformations.

Note that the definitions given below are exemplary, and it is possible to simplify the definitions of 'cmpa', 'cmp1', 'cmpn', 'sel1' and 'seln', for example, using a common type to remove the redundancy, but each with its own definition and semantics.

1 Composite of All
1.1 Definition
Box Type: 'cmpa'
Mandatory (per sample): No
Quantity (per sample): Any The Composite of All 'cmpa' transform property, when present, requires that num_inputs is greater or equal to 1, and the input entities for the corresponding image operation are visual tracks.

This transform property specifies reference width and height of a derived sample, reference_width and reference_height, and places (or composes) each input image onto the derived sample at its corresponding location specified by top_left_x and top_left_y and with the corresponding size width and height.

1.2 Syntax

```
aligned(8) class CompositeOfAll
    extends TransformProperty('cmpa') {
        unsigned int(16)   reference_width;
        unsigned int(16)   reference_height;
        for (i=0; i<num_inputs; i++) {
            unsigned int(16)   top_left_x;
            unsigned int(16)   top_left_y;
            unsigned int(16)   width;
            unsigned int(16)   height;
        }
    }
```

1.3 Semantics

The fields of the sample 'cmpa' transform property have the same semantics as the timed metadata sample entry and sample as defined in ISO/IEC 23001-10. This is because the intention here is to consider each input image as an ROI of the derived image.

reference_width and reference_height give respectively the width and height of the reference rectangular space in which all coordinates (top_left_x, top_left_y, width and height) are computed. These fields define the size of the derived image which is composite of all input images of their corresponding input visual tracks.

top_left_x and top_left_y give respectively the horizontal and vertical coordinate of the top-left corner of the rectangle region that the input media image of the corresponding track is to be placed.

width and height give respectively the width and height of the rectangular region that the input media image of the corresponding track is to be placed.

Note that because of the same semantics of these fields as in '2dcc' defined in ISO/IEC 23001-10, another way to define this transform property is to have an additional list of input tracks, whose size is equal to num_inputs, to indicate that each additional input track is a '2dcc' timed metadata track (i.e., a 2D Cartesian coordinates track) and it carries the spatial information of the corresponding input track as an ROI of the derived track. The transform property is to use these metadata tracks to compose the input visual tracks into the derived track.

Composite of Only One
2.1 Definition
Box Type: 'cmp1'
Mandatory (per sample): No
Quantity (per sample): Any The Composite of Only One 'cmp1' transform property, when present, requires that num_inputs is greater or equal to 1, and the input entities for the corresponding image operation are visual tracks.

This transform property specifies reference width and height of a derived sample, reference_width and reference_height, and places (or composes) one, anyone and only one of the input images onto the derived sample at its corresponding location specified by top_left_x and top_left_y and with its corresponding size width and height.

2.2 Syntax

```
aligned(8) class CompositeOfOnlyOne
    extends TransformProperty('cmp1') {
        unsigned int(16)   reference_width;
        unsigned int(16)   reference_height;
        for (i=0; i<num_inputs; i++) {
            unsigned int(16)   top_left_x;
            unsigned int(16)   top_left_y;
            unsigned int(16)   width;
            unsigned int(16)   height;
        }
    }
```

2.3 Semantics

The fields of the sample 'cmp1' transform property have the same semantics as the timed metadata sample entry and sample as defined in ISO/IEC 23001-10. This is because the intention here is to consider each input image as an ROI of the derived image.

reference_width and reference_height give respectively the width and height of the reference rectangular space in which all coordinates (top_left_x, top_left_y, width and height) are computed. These fields define the size of the derived image which is composite of all input images of their corresponding input visual tracks.

top_left_x and top_left_y give respectively the horizontal and vertical coordinate of the top-left corner of the rectangle region that the input media image of the corresponding track is to be placed.

width and height give respectively the width and height of the rectangular region that the input media image of the corresponding track is to be placed.

Note that because of the same semantics of these fields as in '2dcc' defined in ISO/IEC 23001-10, another way to define this transform property is to have an additional list of input tracks, whose size is equal to num_inputs, to indicate that each additional input track is a '2dcc' timed metadata track (i.e., a 2D Cartesian coordinates track) and it carries the spatial information of the corresponding input track as an ROI of the derived track. The transform property is to use these metadata tracks to compose the input visual tracks into the derived track.

3 Composite of Any
3.1 Definition
Box Type: 'cmpn'
Mandatory (per sample): No
Quantity (per sample): Any The Composite of Any 'cmpn' transform property, when present, requires that num_inputs is greater or equal to 1, and the input entities for the corresponding image operation are visual tracks.

This transform property specifies reference width and height of a derived sample, reference_width and reference_height, and places (or composes) one or more of the input images onto the derived sample at their corresponding location specified by top_left_x and top_left_y and with their corresponding size width and height.

3.2 Syntax

```
aligned(8) class CompositeOfAny
    extends TransformProperty('cmpn') {
        unsigned int(16)   reference_width;
        unsigned int(16)   reference_height;
```

```
        for (i=0; i<num_inputs; i++) {
            unsigned int(16)   top_left_x;
            unsigned int(16)   top_left_y;
            unsigned int(16)   width;
            unsigned int(16)   height;
        }
    }
```

3.3 Semantics

The fields of the sample 'cmp1' transform property have the same semantics as the timed metadata sample entry and sample as defined in ISO/IEC 23001-10. This is because the intention here is to consider each input image as an ROI of the derived image.

- reference_width and reference_height give respectively the width and height of the reference rectangular space in which all coordinates (top_left_x, top_left_y, width and height) are computed. These fields define the size of the derived image which is composite of all input images of their corresponding input visual tracks.
- top_left_x and top_left_y give respectively the horizontal and vertical coordinate of the top-left corner of the rectangle region that the input media image of the corresponding track is to be placed.
- width and height give respectively the width and height of the rectangular region that the input media image of the corresponding track is to be placed.

Note that because of the same semantics of these fields as in '2dcc' defined in ISO/IEC 23001-10, another way to define this transform property is to have an additional list of input tracks, whose size is equal to num_inputs, to indicate that each additional input track is a '2dcc' timed metadata track (i.e., a 2D Cartesian coordinates track) and it carries the spatial information of the corresponding input track as an ROI of the derived track. The transform property is to use these metadata tracks to compose the input visual tracks into the derived track.

4 Selection of Only One
4.1 Definition

Box Type: 'sel1'
Mandatory (per sample): No
Quantity (per sample): Any

The Selection of Only One 'sel1' transform property, when present, requires that num_inputs is greater or equal to 1, and the input entities for the corresponding image operation are visual tracks.

This transform property specifies reference width and height of a derived sample, reference_width and reference_height, and places (or composes) one and only one input image from a same track selected throughout the transformation onto the derived sample at its corresponding location specified by top_left_x and top_left_y and with its corresponding size width and height.

Note that this is equivalent to selecting one track from a list of input tracks.

4.2 Syntax

```
aligned(8) class SelectionOfOnlyOne
    extends TransformProperty('sel1') {
    unsigned int(16)   reference_width;
    unsigned int(16)   reference_height;
    for (i=0; i<num_inputs; i++) {
        unsigned int(16)   top_left_x;
        unsigned int(16)   top_left_y;
        unsigned int(16)   width;
        unsigned int(16)   height;
    }
}
```

4.3 Semantics

The fields of the sample 'sel1' transform property have the same semantics as the timed metadata sample entry and sample as defined in ISO/IEC 23001-10. This is because the intention here is to consider each input image as an ROI of the derived image.

- reference_width and reference_height give respectively the width and height of the reference rectangular space in which all coordinates (top_left_x, top_left_y, width and height) are computed. These fields define the size of the derived image which is composite of all input images of their corresponding input visual tracks.
- top_left_x and top_left_y give respectively the horizontal and vertical coordinate of the top-left corner of the rectangle region that the input media image of the corresponding track is to be placed.
- width and height give respectively the width and height of the rectangular region that the input media image of the corresponding track is to be placed.

Note that because of the same semantics of these fields as in '2dcc' defined in ISO/IEC 23001-10, another way to define this transform property is to have an additional list of input tracks, whose size is equal to num_inputs, to indicate that each additional input track is a '2dcc' timed metadata track (i.e., a 2D Cartesian coordinates track) and it carries the spatial information of the corresponding input track as an ROI of the derived track. The transform property is to use these metadata tracks to compose the input visual tracks into the derived track.

5 Selection of Any
5.1 Definition

Box Type: 'seln'
Mandatory (per sample): No
Quantity (per sample): Any

The Selection of Any 'seln' transform property, when present, requires that num_inputs is greater or equal to 1, and the input entities for the corresponding image operation are visual tracks. This transform property specifies reference_width and height of a derived sample, reference_width and reference_height, and places (or composes) one or more input images from a same subset of input tracks selected throughout the entire transformation onto the derived sample at their corresponding location specified by top_left_x and top_left_y and with their corresponding size width and height.

Note that this is equivalent to selecting n (n>0) tracks from a list of input tracks.

5.2 Syntax

```
aligned(8) class SelectionOfAny
    extends TransformProperty('seln') {
    unsigned int(16)   reference_width;
    unsigned int(16)   reference_height;
    for (i=0; i<num_inputs; i++) {
        unsigned int(16)   top_left_x;
        unsigned int(16)   top_left_y;
        unsigned int(16)   width;
        unsigned int(16)   height;
    }
}
```

5.3 Semantics

The fields of the sample 'cmp1' transform property have the same semantics as the timed metadata sample entry and sample as defined in ISO/IEC 23001-10. This is because the intention here is to consider each input image as an ROI of the derived image.

reference_width and reference_height give respectively the width and height of the reference rectangular space in which all coordinates (top_left_x, top_left_y, width and height) are computed. These fields define the size of the derived image which is composite of all input images of their corresponding input visual tracks.

top_left_x and top_left_y give respectively the horizontal and vertical coordinate of the top-left corner of the rectangle region that the input media image of the corresponding track is to be placed.

width and height give respectively the width and height of the rectangular region that the input media image of the corresponding track is to be placed.

Note that because of the same semantics of these fields as in '2dcc' defined in ISO/IEC 23001-10, another way to define this transform property is to have an additional list of input tracks, whose size is equal to num_inputs, to indicate that each additional input track is a '2dcc' timed metadata track (i.e., a 2D Cartesian coordinates track) and it carries the spatial information of the corresponding input track as an ROI of the derived track. The transform property is to use these metadata tracks to compose the input visual tracks into the derived track.

6 Scaling
6.1 Definition
Box Type: 'scal'
Mandatory (per sample): No
Quantity (per sample): Any The sample scaling 'scal' transform property scales the input image item in units of percentages.

6.2 Syntax

```
aligned(8) class SampleScaling
extends TransformProperty('scal') {
    unsigned int (8) percentages;
}
```

6.3 Semantics percentages/100 specifies a scaling factor of the input image.

7 Resizing
7.1 Definition
Box Type: 'srez'
Mandatory (per sample): No
Quantity (per sample): Any The sample resizing 'srez' transform property resizes the input image item according to a width and a height.

7.2 Syntax

```
aligned(8) class SampleResizing
extends TransformProperty('srez') {
    unsigned int(16)  width;
    unsigned int(16)  height;
}
```

7.3 Semantics width and height give respectively the width and height of the resized input image.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
    processing circuitry configured to:
        receive a file that includes elementary track boxes respectively for elementary tracks, an elementary track box of the elementary track boxes indexing a sequence of media samples that form a corresponding elementary track in a time order;
        construct composite track boxes for composite tracks having a hierarchy, the composite track boxes including a first composite track box for a first composite track of the composite tracks, the first composite track box identifying one or more elementary tracks or one or more other composite tracks of the composite tracks, and identifying a composite operation to form the first composite track based on the one or more elementary tracks or the one or more other composite tracks of the composite tracks; and
        generate a media presentation based on the first composite track.

2. The apparatus of claim 1, wherein the processing circuitry is configured to:
    construct a second composite track box for a second composite track of the composite tracks, the second composite track box identifying a second composite operation that selects one of the elementary tracks at a track level to form the second composite track.

3. The apparatus of claim 1, wherein the processing circuitry is configured to:
    construct a second composite track box for a second composite track of the composite tracks, the second composite track box identifying a second composite operation that selects one of the elementary tracks at a sample or sample group level to form the second composite track.

4. The apparatus of claim 1, wherein the processing circuitry is configured to:
    construct a second composite track box for a second composite track of the composite tracks, the second composite track box identifying a second composite operation that selects one or more elementary tracks of the elementary tracks to form the second composite track.

5. The apparatus of claim 1, wherein the processing circuitry is configured to:
    include global information for the identified one or more elementary tracks in the first composite track box.

6. The apparatus of claim I, wherein the processing circuitry is configured to:
    receive a value for a composition variable associated with the composition operation; and
    construct a media stream based on the elementary tracks according to the composite operation and the value.

7. The apparatus of claim 1, wherein the processing circuitry is configured to perform at least one of:

constructing the elementary track box that indexes media samples for a spatial partition of an imaging region;

constructing the elementary track box that is indicative of an image quality to form the elementary track; and constructing the elementary track box that is indicative of an encryption mode to form the elementary track.

8. A method for processing media data, comprising:

receiving a file that includes elementary track boxes respectively for elementary tracks, an elementary track box of the elementary track boxes indexing a sequence of media samples that form a corresponding elementary track in a time order;

constructing composite track boxes for composite tracks having a hierarchy, the composite track boxes including a first composite track box for a first composite track of the composite tracks, the first composite track box identifying one or more elementary tracks or one or more other composite tracks of the composite tracks, and identifying a composite operation to form the first composite track based on the one or more elementary tracks or the one or more other composite tracks of the composite track; and generating a media presentation based on the first composite track.

9. The method of claim 8, further comprising:

constructing a second composite track box for a second composite track of the composite tracks, the second composite track box identifying a second composite operation that selects one of the elementary tracks at a track level to form the second composite track.

10. The method of claim 8, further comprising:

constructing a second composite track box for a second composite track of the composite tracks, the second composite track box identifying a second composite operation that selects one of the elementary tracks at a sample or sample group level to form the second composite track.

11. The method of claim 8, further comprising:

constructing a second composite track box for a second composite track of the composite tracks, the second composite track box identifying a second composite operation that selects one or more elementary tracks of the elementary tracks to form the second composite track.

12. The method of claim 8, wherein the first composite track box identifies the one or more other composite tracks that correspond to one or more hierarchical levels lower than a hierarchical level of the first composite track box.

13. The method of claim 8, further comprising:

including global information for the identified elementary tracks in the composite track box.

14. The method of claim 8, further comprising:

receiving a value for a composition variable associated with the composition operation; and constructing a media stream based on the elementary tracks according to the composite operation and the value.

15. The method of claim 8, further comprising at least one of:

constructing the elementary track box that indexes media samples for a spatial partition of an imaging region;

constructing the elementary track box that is indicative of an image quality to form the elementary track: and constructing the elementary track box that is indicative of an encryption mode to form the elementary track.

16. A non-transitory computer readable medium storing program instructions for causing a processor to execute operations for processing media data, the operations comprising:

receiving a file that includes elementary track boxes respectively for elementary tracks, an elementary track box of the elementary track boxes indexing a sequence of media samples that form a corresponding elementary track in a time order;

constructing composite track boxes for composite tracks having a hierarchy, the composite track boxes including a first composite track box for a first composite track of the composite tracks, the first composite track box identifying one or more elementary tracks or one or more other composite tracks of the composite tracks, and identifying a composite operation to form the first composite track based on the one or more elementary tracks or the one or more other composite tracks of the composite track; and generating a media presentation based on the first composite track.

17. The non-transitory computer readable medium of claim 16, wherein the operations further comprise:

constructing a second composite track box for a second composite track of the composite tracks, the second composite track box identifying a second composite operation that selects one of the elementary tracks at a track level to form the second composite track.

18. The non-transitory computer readable medium of claim 16, wherein the operations further comprise:

constructing a second composite track box for a second composite track of the composite tracks, the second composite track box identifying a second composite operation that selects one of the elementary tracks at a sample or sample group level to form the second composite track.

19. The non-transitory computer readable medium of claim 16, wherein the operations farther comprise:

constructing a second composite track box for a second composite track of the composite tracks, the second composite track box identifying a second composite operation that selects one or more elementary tracks of the elementary tracks to form the second composite track.

* * * * *